April 7, 1959  C. H. NEHLS  2,880,605
LOCKING CLOSURE
Filed April 4, 1956  2 Sheets-Sheet 1
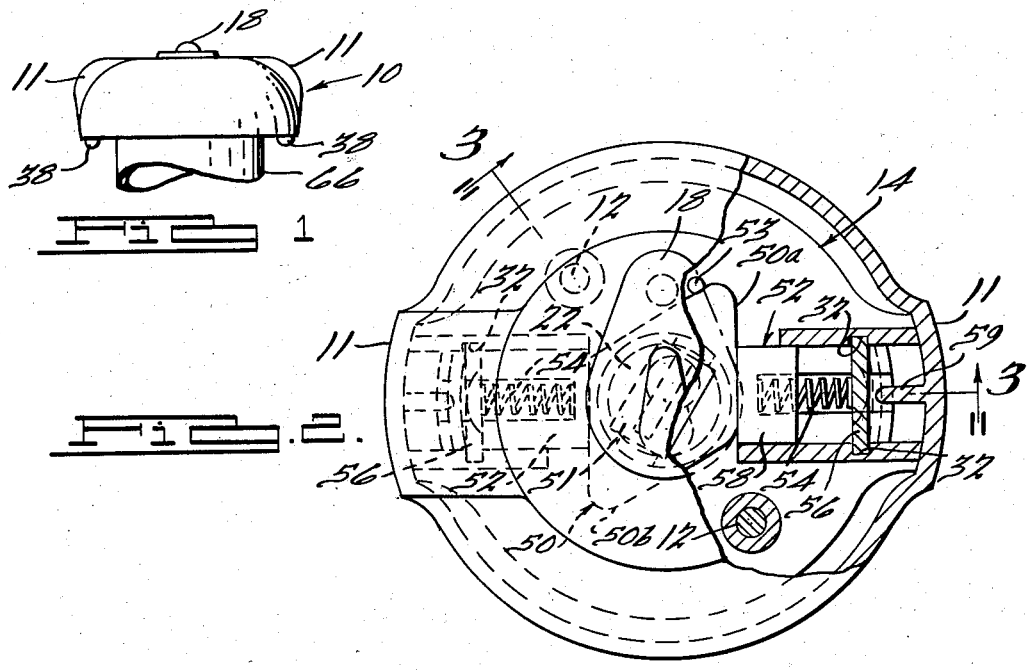
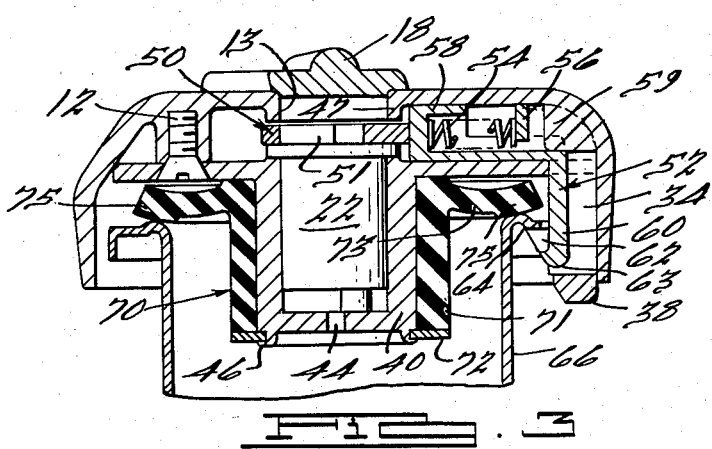
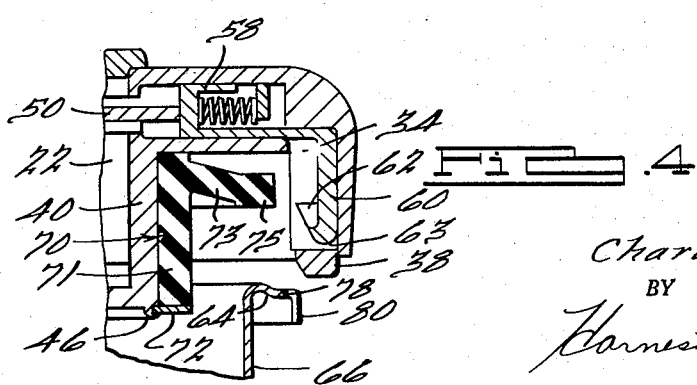
INVENTOR.
Charles H. Nehls.
BY
Harness, Dickey & Pierce
ATTORNEYS April 7, 1959  C. H. NEHLS  2,880,605
LOCKING CLOSURE
Filed April 4, 1956  2 Sheets-Sheet 2
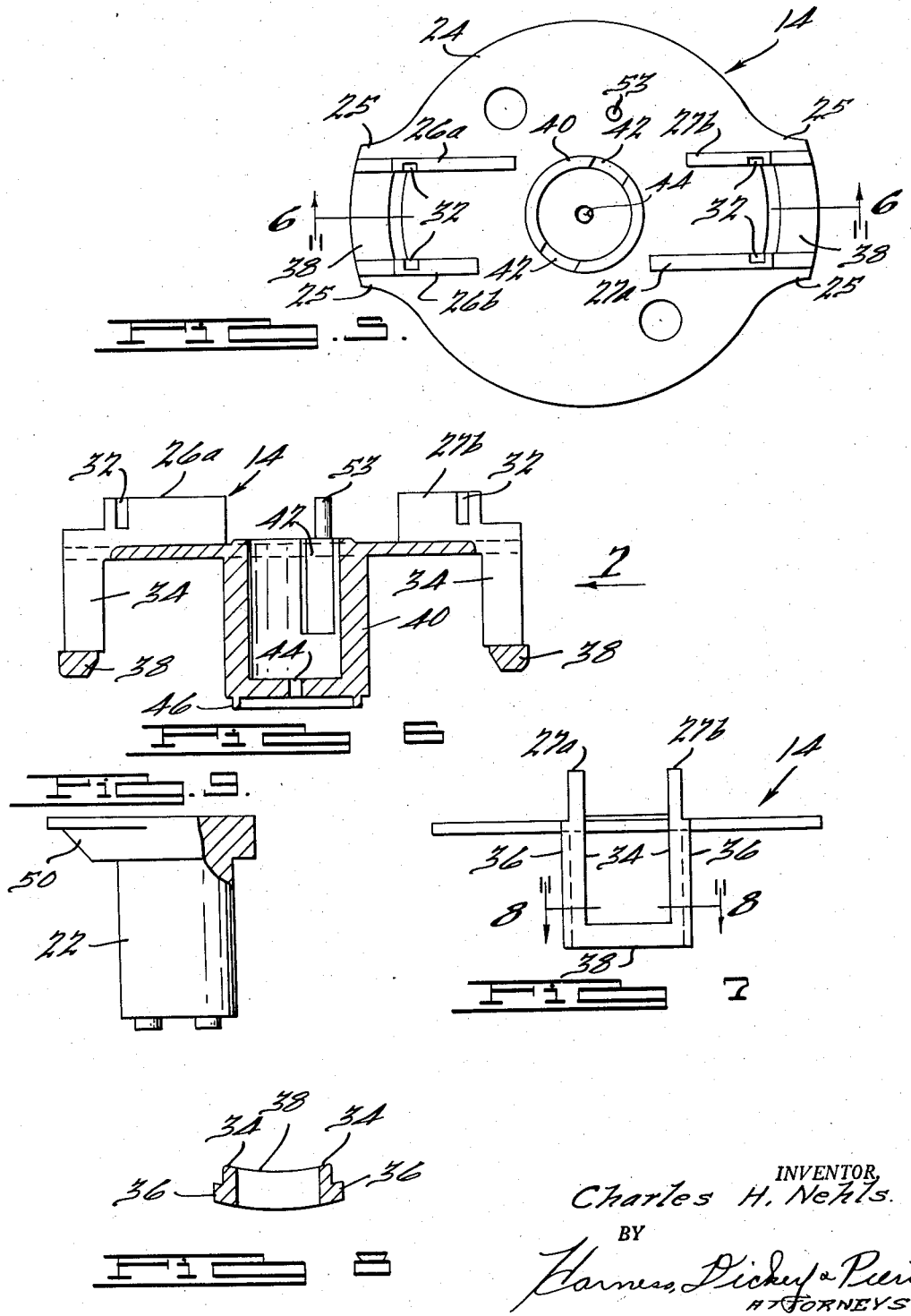
INVENTOR,
Charles H. Nehls.
BY
Harness, Dickey & Pierce
ATTORNEYS.

United States Patent Office 2,880,605
Patented Apr. 7, 1959

2,880,605

LOCKING CLOSURE

Charles H. Nehls, Detroit, Mich., assignor to Wayne Metalcraft Company, Chicago, Ill., a corporation of Illinois Application April 4, 1956, Serial No. 576,178

5 Claims. (Cl. 70—169)

The present invention relates to improved locking caps and more particularly to improved locking caps for gasoline tank filler necks of automobiles.

It has become common in the construction of automobiles to locate the gasoline filler neck and cap in a relatively confined recess in the car body and to construct the neck with an outwardly projecting flange for engagement with the holding parts of a conventional non-locking cap. The recess is also frequently covered by a door which is spring-biased toward its closed position. When a locking cap is employed, it is, of course, necessary to manipulate the key as well as the cap itself and this ordinarily necessitates the use of both hands within the space provided. Not only is this difficult in such a confined space, but since the locking mechanism must engage an external flange, it is also difficult to encompass the necessary locking mechanism within a cap structure small enough to provide adequate clearance between the cap and the walls of the recess for the hand and fingers to grasp the exterior of the cap and to permit removal thereof.

Accordingly, one object of the instant invention is to provide an improved and extremely compact locking cap for gasoline tank filler necks of the type having outwardly extending flanges.

Another object is to provide a locking cap which is neat in appearance and of improved simplicity and ruggedness of construction, and which is quicker and easier to assemble than presently known designs, so that assembly costs are reduced.

These and other objects are accomplished by the instant invention, one embodiment of which comprises an improved locking cap similar in general outline but differing in certain essential constructional features from the gas tank locking cap described and claimed in my copending application, Serial No. 500,765, filed April 12, 1955. The improved cap comprises latch bolts arranged to engage an outwardly projecting flange, and cam actuatable to release the flange. The entire operating mechanism of the improved cap is mounted upon a single body member and enclosed by a cap cover in a manner which not only effects an improved compactness, but also facilitates assembly of the cap during its manufacture.

The invention will be described in greater detail in connection with the accompanying drawings of which:

Figure 1 is an elevational view of a locking cap constructed in accordance with the present invention, showing a fragment of a filler neck upon which the cap is installed;

Fig. 2 is a plan view, partly broken away and in section, of the locking cap shown in Fig. 1;

Fig. 3 is a cross-sectional view of the locking cap shown in Figs. 1 and 2 taken along the section lines 3—3 of Fig. 2 and showing the cap latched to a filler neck;

Fig. 4 is a sectional view of a part of the cap shown in Fig. 3 showing the cap detached from the filler neck and with the latch bolts retracted;

Fig. 5 is a plan view of the body member of the locking cap shown in Figs. 1–4;

Fig. 6 is a vertical, sectional view of the body member shown in Fig. 5 taken along the section line 6—6 thereof;

Fig. 7 is an elevational view of the body member shown in Fig. 6 taken in the direction of the arrow 7 thereof;

Fig. 8 is a sectional view of a portion of the body member shown in Fig. 7 taken along the line 8—8 thereof; and Fig. 9 is an elevational view of a lock plug and a rollback cam formed integrally therewith according to one embodiment of the invention.

Referring now to the drawings, the reference character 10 designates generally the cover of an improved cap according to a preferred embodiment of the invention. The cover shown is bell-shaped but its exact contouring is, of course, subject to variation. In its preferred form the cover 10 is shaped to fit relatively closely around a gasoline tank filler neck 66 along most of its circumference. Its side walls are formed with two diametrically opposite, outwardly extending portions 11 which define inwardly facing recesses shaped to accommodate, and to permit limited outward radial travel of, a pair of latch bolts 52 enclosed within the cover.

The cover 10 is attached by two screws 12 to a body generally designated 14. All of the locking parts and mechanism are adapted to be preliminarily assembled with respect to and supported by the body 14 before the cover 10 is attached. The cover functions principally to retain the parts in position, to conceal the locking mechanism and to prevent tampering. It is preferably attractively finished as by chrome plating to improve the appearance of the cap. The cover 10 also includes a central aperture 13 protected by a pivoted dust cover 18 which may be swung aside to provide access to a lock plug 22 rotatably fitted within a cylinder portion 40 integral with the body 14.

The body 14 is shown most clearly and without the other elements of the cap in Figs. 5–8. It has a flat plate-like upper portion 24 which, like the cover, may be slightly oval in shape, as shown, and includes two pairs of outwardly extending coplanar tabs or ears 25, each pair of which carries and reinforces a pair of parallel upstanding bolt guide flanges 26a, 26b and 27a, 27b. The entire body 14 including these and other parts to be described may be integrally formed by die casting, as will be appreciated. Bolt guide channels are formed by the two pairs of upstanding flanges, or ribs 26a, 26b and 27a, 27b disposed on the upper surface of the plate portion 24 and integral therewith. All of the flanges are parallel to the longest diameter of the body 14 and are provided with opposed, inwardly facing notches, or recesses 32, the purpose of which will be described presently. One member 26b and 27b of each of the guide pairs is reduced in length at its inner end to permit clearance for operation of a rollback cam 50, as shown in Fig. 2. The bolt guides also include parallel depending web portions 34 integral with the disc portion 24 of the body and in vertical alignment with the upstanding guide ribs 26a, 26b and 27a, 27b. The depending web portions 34 form in effect downward extensions of the guide ribs 26a, 26b and 27a, 27b. Short skirt-like, circumferentially extending flange portions 36 are provided, integral with and extending outwardly from and serving to reinforce the radial web portions 34. An integral guard portion 38 extends across and joins the lower ends of the web portions 34 of each guide to protect the bolts against tampering and to assist in guiding the cap onto the filler neck.

The lock plug receiving cylinder portion 40 depends from the center of the plate portion 24 and its inner wall is provided with slots 42 to engage the tumblers (not shown) of a lock plug 22 to restrain the lock plug from rotational movement when locked. A vent hole 44 extends through the floor of the cylinder 40, and a flange 46 depends from the underside of the cylinder floor. This flange 46 is staked or spun outwardly in assembly of the cap structure to retain a combined gasket and spring member to be described hereinafter.

The lock plug 22 is formed with a rectangular boss 51 on its upper surface and surrounding the keyhole and adapted to fit into a conformably-shaped central aperture (not separately designated) in a rollback cam 50. The cam 50 may be a flat piece of metal such as brass or the like of a generally diamond shape as shown. It may be separate from, or, alternatively, it may be cast integrally with the lock plug 22, as illustrated in Fig. 9. In either construction, the lock plug 22 is retained in the cylinder 40 between the floor of the cylinder and the cover 10. An annular flange 47, positioned on the cover 10 around the central aperture 13 thereof, overhangs and retains the rollback cam 50 to prevent displacement of either the cam or the lock plug 22 and to prevent withdrawal of the plug from the cylinder. Thus, no separate retaining devices are required for either the lock plug 22 or the cam.

The cam 50 is provided with two lobes 50a and 50b projecting radially between the cover 10 and the plate portion 24 to engage the inner ends of a pair of radially positioned bolts 52 which are slidably fitted between the flanges 26 and 27. An upstanding boss 53 may be provided on the body 14 to prevent accidental reverse rotation of the cam 50 from its locked position. Each of the bolts 52 is biased radially inwardly by a spring 54 which bears against a retaining plate 56 held in the recesses 32. Upward escape of the springs 54 is prevented by reversely turned flanges 58 on the bolts which form seating sockets for the springs. As best shown in Fig. 3, upward escape of the bolts 52 is prevented by the flanges 58 which extend close to the cover 10, and by radial lug portions 59 which extend downwardly from the outer edge of the upper portion of the cover 10. Thus, the bolts 52 are mounted for smooth, sliding, radial travel within the channels formed by the ribs 26a, 26b and 27a, 27b.

Depending from the outer end of each bolt 52 is a leg portion 60 that projects between one of the pairs of depending skirt portions 34 of the bolt guides. The lower end of each leg portion 60 carries an inwardly extending latch hook portion 62 adapted to underengage the flange 64 of a gasoline tank filler neck when the bolts are drawn inwardly. When the cap is locked, the rollback cam 50 is positioned to allow the springs 54 to retract the bolts inwardly toward the center of the cap. When the lock plug 22 is rotated away from the unlocked position, the cam 50 moves the lock bolts outwardly sufficiently to free them from the neck flange 64. The lower surface 63 of each latch 62 is convexly curved so that the bolts are cammed outwardly by the flange 64 as the cap is moved into engagement therewith. Thus, the cap may be simply snapped into locking engagement with the flanged filler neck 66 without manipulating the lock plug.

A sealing and spring biasing gasket 70 is positioned on the lower side of the body 14. The gasket 70 is preferably made of a relatively soft, elastic composition such as neoprene or gasoline-resistant rubber. It comprises a retaining sleeve portion 71, a conical flexing portion 73 and an annular sealing rim 75 which is somewhat thick in cross section. The sleeve portion 71 is fitted snugly upon the outside of the lock cylinder 40 and is retained thereon by a washer 72 secured by the flared flange 46. The conical portion 73 acts, in combination with the rim 75, as a spring for urging the cap upwardly when the bolts are released, and for preventing rattling when the cap is locked in place, as well as to provide a substantially sealed closure for the filler neck. The rim 75 has a flat bottom adapted to bear against the end of the filler neck, and to be forced upwardly with respect to the sleeve portion 71 when the cap is pushed down upon the filler neck far enough to permit the bolts to shoot under the rim 64. The conical portion 73 is restrained from flaring and stretching outwardly during this action by the tying effect of the heavier sealing rim 75, although a limited amount of controlled stretching of the rim and adjacent conical web portions 73 may be permitted. The conical web 73 is thus brought into and held under compression, being also bent upwardly as shown in Fig. 4. As the cap is pushed down, the rim 75 is somewhat stretched because the web 73 is thick enough to resist radial compression so that the elasticity of both the conical portion 73 and of the rim 75 is thus brought into play in biasing the cap away from the filler neck. As shown in Fig. 3, rim 75 is preferably not forced all the way up against plate portion 24 when the cap is locked in place, permitting the cap to be moved slightly downwardly over the filler neck to reduce the friction on the bolts during unlocking.

The guards 38 positioned between the depending skirt portions 34 of the guides conceal the latch portions 62 of the bolts and protect them from unauthorized tampering so that they may not be readily manipulated from below when the cap is seated on a filler neck, and provide added bearing surfaces opposing cocking of the bolts laterally.

The spacing between the depending skirt portions 34 of the body 14 is such as to clear but to fit relatively closely around the periphery of the out-turned flange 64 of a filler neck of the type the cap is intended to fit. The flanges of such filler necks are customarily provided with diametrically opposed, radially extending notches 78 to provide clearance for retaining fingers carried by conventional, non-locking caps. Such retaining fingers, after passing through the notches, are rotated to engage a depending skirt wall 80 of the flange to lock the conventional cap to the filler neck in bayonet fashion. The improved locking cap according to the invention does not coact with the depending skirt wall 80, but only with the horizontal portion 64 of the flange in the areas of the notches 78. The guards 38, carried by the depending guide channel flanges 34 and 36 are proportioned and positioned to fit through the notches 78 so that the cap can be applied to the filler neck only when the guards 38 are aligned with the notches 78.

It is also common to provide an air vent for the tank by deforming a portion of the filler neck flange 64 in the area of one of the notches 78 to form a vertical, generally V-shaped depression, or groove therein, centered with respect to the notch. The latch hook portions 62 of the bolts 52 are centrally relieved by notch-like kerfs (not designated) to accommodate such a groove. Thus, in whichever of the two diametrically reversed positions the cap is applied to the filler neck, the kerf of one of the bolts will straddle the vent groove to insure proper seating of the cap.

Assembly of the locking cap of the invention is relatively simple since all of its internal parts may be mounted upon the body 14 before the cover 10 is attached. The cap may be simply and quickly assembled merely by placing the lock plug 22 within the cylinder 40, engaging the cam 50 on the lock plug, placing the bolts 52 together with the biasing springs 54 and the retaining plates 56 in the guides, and then fastening the cover 10 in place with the two screws 12. The gasket 70 is fitted on the lower side of the body 14, the retaining washer 72 is placed against the gasket, and the flange 46 is staked or flared to secure the washer 72.

It will be seen that literally none of the mechanism extends outwardly farther than the filler neck flange except the hook-like latch bolt portions 60, 63, and that the radial size of the assembly is held to a minimum so that it may be easily manipulated within a relatively small space. Part of the reduction in size, relative to previous locking caps, is accomplished by limiting the circumferential extent of the depending skirt-like flange portions 36 of the body 14, thus permitting a flattening of the cap in a direction perpendicular to the axis of the latch bolts. These skirt portions are made only wide enough to reinforce the guide members 34 adequately.

There has thus been described an improved locking cap which is relatively compact, simple and rugged in construction, and easily and readily assembled.

What is claimed is:

1. A locking closure for automotive gasoline tank filler necks of the type having outwardly turned flanges, said closure comprising a mounting plate having a central recess adapted to receive and coact with a lock plug, a lock plug in said recess, an upwardly opening guide channel defined by flanges upon the upper surface of said mounting plate, a latch bolt having a downwardly and inwardly extending catch for engaging the outwardly turned flange of a filler neck and being supported on said mounting plate and slidably mounted in said upwardly opening guide channel and spring biased radially inwardly with respect to said plate, and a cap member secured to said mounting plate, said cap member being of generally inverted cup form and having a transverse upper portion and a circumferential skirt portion depending therefrom and fitting over and extending around said mounting plate, said lock plug, and said latch bolt and said catch to form a concealing, protective enclosure thereabout and to retain said lock plug and also to retain said latch bolt in said recess and in said channel, respectively.

2. A locking closure for automotive gasoline tank filler necks of the type having outwardly turned flanges, said closure comprising a mounting plate having a central recess adapted to receive and coact with a lock plug, a lock plug disposed in said recess and lockable therein against rotation, said plate including upstanding flanges on its upper surface defining a pair of diametrically opposite radial channels, a pair of latch bolts slidably disposed in said channels and spring biased radially inwardly with respect to said plate, each one of said lock bolts including a downwardly extending leg having an inwardly extending catch adapted to engage a filler neck flange, a concealing protective and retaining cap fitted over said mounting plate, said lock plug, and said lock bolts, said cap being shaped to cover said channels and to prevent upward escape of said bolts and of said lock plug, and guard means fixedly mounted on said plate and positioned adjacent to each of said catches, said cap including a depending skirt positioned adjacent to said guard means and cooperative therewith to protect said catches against tampering when said closure is engaged on a gasoline tank filler neck.

3. A locking closure according to claim 2 in which each of said upstanding flanges is horizontally recessed adjacent to its radially outer end, and said latch bolts are biased by springs held in compression between retaining plates and outwardly facing sockets formed in said bolts at the radially inner ends thereof, and retaining plates being seated in the recesses of said flanges.

4. A locking cap for a filler neck or the like having an outwardly projecting flange, said cap comprising a body including a central recess and upstanding latch bolt guide flanges, a lock plug seated in said recess and lockable therein against angular movement, a pair of latch bolts seated on said body between different respective pairs of said flanges, a rollback cam fixed to said lock plug for rotation therewith and operative to drive said latch bolts outwardly away from said recess when said lock plug is rotated, spring biasing means to urge said latch bolts inwardly, and a cover member secured to said body to conceal said lock plug and cam, said latch bolts, and said spring means, and to prevent escape thereof, said body including depending, radially extending skirt portions and depending, peripherally extending skirt portions integral therewith, said radial skirt portions being joined to and aligned with respective ones of said upstanding flanges to form depending latch bolt guide channels, said radial skirt portions being connected at their lower ends by a guard member to close the lower ends of said guide channels, said cover member including a depending skirt positioned to close the radially outer sides of said depending guide channels, said latch bolts including depending legs disposed within said depending guide channels and radially movable therein, each one of said leg portions including a flange-engageable, inwardly extending latch portion at the lower end thereof to engage an outwardly extending flange of a filler neck, said peripheral skirt portions being integral with said radial skirt portions and extending therefrom outwardly from said guide channels only partially around the periphery of said body.

5. In a locking cap for a filler neck or the like of the type having an outwardly projecting flange, the improvement comprising a body assembly including a unitary body member having a generally flat upper plate portion and upstanding flanges thereon defining a pair of open-topped radial bolt guide channels, said body member also having a central recess and depending skirt-like flanges generally aligned with said upstanding flanges, said central recess being shaped to receive a cylindrical lock plug, a lock plug disposed in said recess and lockable therein against rotation, a pair of latch bolts each having a downwardly and inwardly extending catch for engaging the outwardly projecting flange of a filler neck and being slidably fitted in said guide channels and having upwardly extending outwardly opening sockets fixed at their radially inner ends, said flanges having oppositely inwardly opening transverse slots adjacent to their radially outer ends, abutment members disposed in said slots and extending across said guide channels, springs held in compression between said abutment members and said bolt sockets for urging said bolts radially inwardly with respect to said body member, a rollback cam mounted on top of said lock plug for rotation therewith and in abutting engagement with said latch bolts, said cam being effective to drive said latch bolts outwardly in response to rotation of said lock plug, and a cover member secured to said body assembly in overlying relationship to said lock plug and cam, said latch bolts and catches, and said abutment members to retain them in said central recess, said channels, and said notches, respectively, and forming a protective enclosure for said latch bolt catches.

References Cited in the file of this patent

UNITED STATES PATENTS

| | | |
|---|---|---|
| 1,006,944 | Holdridge | Oct. 24, 1911 |
| 1,244,450 | Christoph | Oct. 23, 1917 |
| 1,878,436 | Burroughs | Sept. 20, 1932 |
| 2,008,625 | Moulds | July 16, 1935 |
| 2,747,763 | Sach | May 29, 1956 |

FOREIGN PATENTS

| | | |
|---|---|---|
| 456,841 | Italy | Apr. 26, 1950 |